Figure 1:
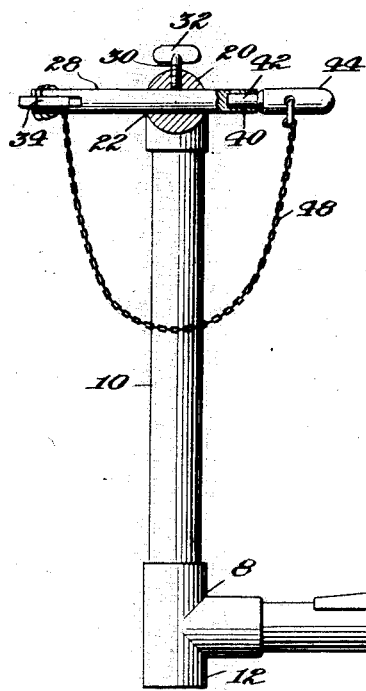
Figure 1:
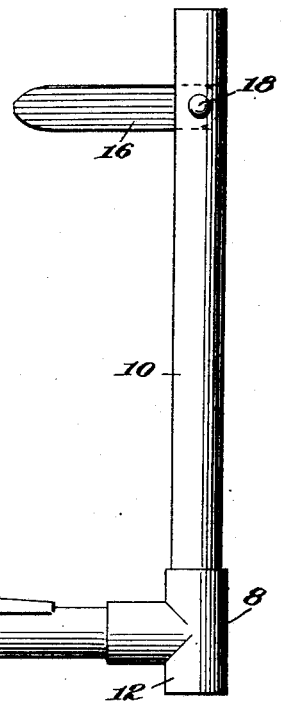

Dec. 25, 1928.  C. H. ARCHER  1,696,290

WHEEL ALIGNING GAUGE

Filed Aug. 27, 1927  2 Sheets-Sheet 1

Inventor:
Capelle H. Archer,
Attÿ.

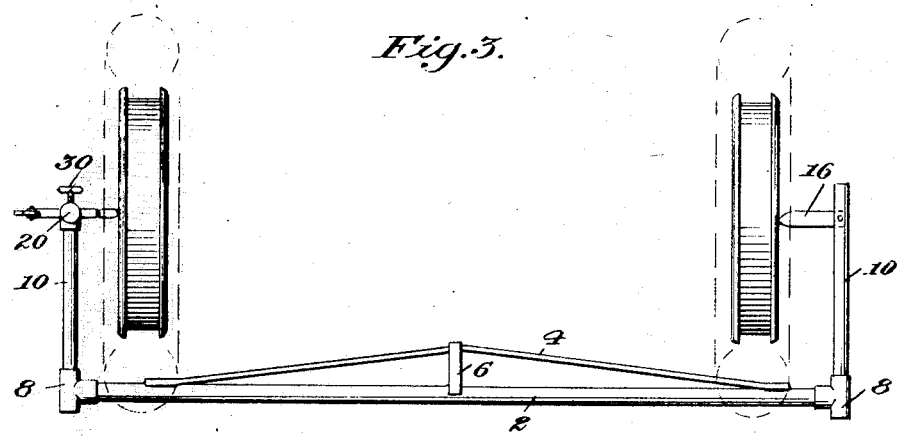
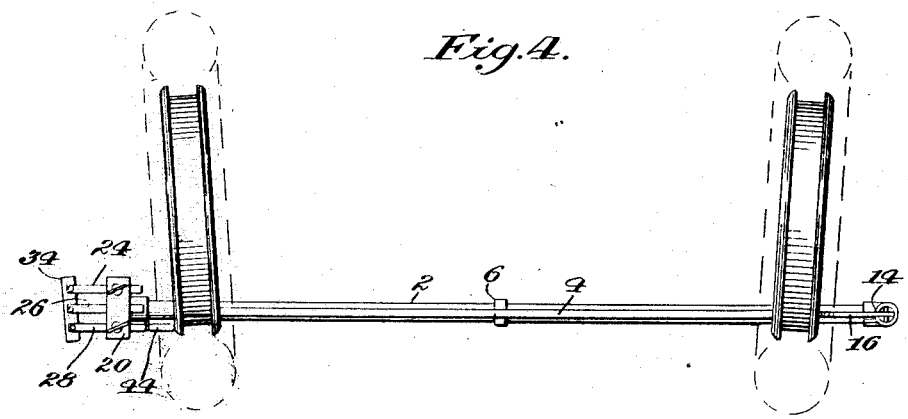

Patented Dec. 25, 1928.

1,696,290

UNITED STATES PATENT OFFICE.

CAPELLE HATCHER ARCHER, OF TAMPA, FLORIDA.

WHEEL-ALIGNING GAUGE.

Application filed August 27, 1927. Serial No. 215,869.

This invention relates to gauges and has particular reference to gauges for determining the trueness of vehicle wheels and facilitating the proper aligning thereof.

Untrue or improperly aligned vehicle wheels are accompanied by serious results such as excessive and irregular wear on the wheel bearings, increased friction with greater fuel consumption, and finally, short life of the tires. Owing to the importance of accurately aligning the wheels and maintaining them in this condition, many devices have been purposed for this purpose. However, these prior truing devices have possessed certain disadvantageous features which detracted from their use, and as a result, few have entered into commercial use or enjoyed noteworthy popularity. Among the objections to former aligning devices were complexity in construction, cumbersomeness in handling, and in practically every instance, the alignment was determined by a computation on some kind of scale, thus requiring some skill and affording opportunities for errors and mistakes.

A general object of the present invention is to provide an improved aligning guage in which the disadvantages referred to are eliminated.

A further object is to provide a wheel aligning gauge which is practically infallibly accurate and which clearly indicates the amount of disalignment between the wheels without requiring measurement on a scale or other mental calculation. The gauge is so constructed as to automatically indicate the trueness or amount of disalignment between the wheels when properly manipulated by the user.

These and other features of the invention will appear in the following detailed description when read in connection with the accompanying drawings and will be pointed out in the appended claims.

Figure 2:
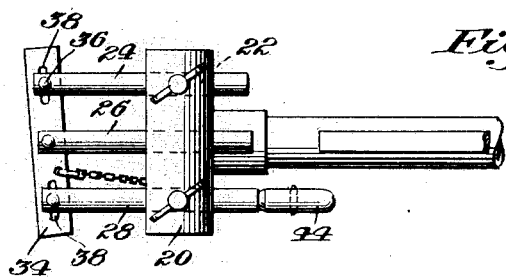
Figure 2:
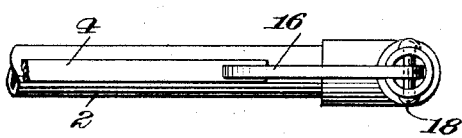

In the drawings:

Fig. 1 is a side elevation of the invention, parts being shown in section to illustrate the construction, Fig. 2 is a plan view, Fig. 3 is a side elevation of the gauge in testing position upon the vehicle wheels, and Fig. 4 is a plan of the gauge in testing position.

Referring more specifically to the drawings, the reference character 2 indicates a cross bar adapted to extend transversely beneath the vehicle and being slightly greater in length than the width of the vehicle. As illustrated, the cross member is formed from a tubular pipe, but obviously any other shape may be used as desired. The cross bar is reinforced against distortion or bending by means of a brace 4 connected at each end directly to the bar and spaced therefrom at the center by the block 6.

At each end of the cross bar 2, a T-shaped joining member 8 is provided, and mounted therein is a vertical standard 10. The lower ends 12 of the joining members serve as supporting legs for the gauge. The standards 10 are normally positioned adjacent to the outside of the vehicle wheels and carry the felloe contacting gauge members. One of the standards 10 is provided with a vertical slot 14 adjacent its upper end in which is mounted a stop element 16 pivoted to the standard at 18. When the gauge is used, the stop member 16 is positioned at right angles to its supporting standard and extends inwardly therefrom into contact with the felloe of the vehicle wheel. The stop member is located in a horizontal plane passing through the axis of the vehicle. When the gauge is being brought into position the stop member is moved about its pivot to occupy a position in alignment with the standard so that it may clear the periphery of the tire and thus be brought into engagement with the felloe. The stop member is retained in the horizontal position indicated in Figs. 1 and 3 by its engagement with the lower end of the vertical slot 14.

The upper end of the other vertical standard is provided with a transverse cross member 20 through which extend three openings or bores 22, the central bore being arranged in alignment with the vertical axis of the standard and the end bores being equally spaced on opposite sides thereof. All of the bores 22 are in a horizontal plane passing through the axle of the vehicle and the stop member 16. Slidably mounted in the bores 22 are adjusting elements 24, 26, and 28 which snugly fit the bores but are capable, under certain conditions, of a free sliding movement therein. The central member 26 is made slightly greater in length than the end members so as to permit a determination of the toe-in of the wheel in a manner hereinafter apparent. The two end members 24 and 28 are locked in any desired position by means of cap screws 30 which extend through the upper portion of the cross member 20, each of these screws being provided with an enlarged wing 32 for facilitating manual manipulation. The outer ends of the slidable members are pivotally connected to a rigid cross member 34 in any convenient manner such as by pivots or bolts 36. The pivots of each of the end sliding members, 24 and 28, operate in an elongated slot 38, which permit the cross bar and members to assume various positions of relative angular adjustment. The free or inner ends of the sliding members terminate a sufficient distance from the widest portion of the vehicle tire to afford a clearance for the standard to be brought into vertical position. With this construction, it will be apparent that the sliding members will be spaced from the tire felloe a substantial distance even when shoved toward the felloe as far as permitted by the cross member 34, and as measurements are made from the felloe, provision must be made for bridging the space between the sliding members and the felloe. To this end, the inner end of the slidable members are recessed as at 40 for receiving the reduced end 42 of a gauging or measuring element 44 attached to the cross bar by a chain 48. The gauging element is made of such length that when connected to the slidable members, the gap between the latter and the felloe will be substantially bridged thereby. In manipulation, the gauging member is selectively positioned in the ends of each of the sliding members in order to determine the proper trueness of the wheels in a manner now to be described.

To operate, the device is laid upon the floor or vehicle supporting surface, shoved under the vehicle behind the wheels, and rotated to bring the standards 10 into a vertical position adjacent to and on the outside of the wheels. The stop member 16 is then swung inwardly until it contacts with the felloe of the adjacent wheel as indicated in Figs. 3 and 4. Having made this adjustment on one side of the vehicle, the operator positions the gauging element 44 in the recess of the rearmost sliding element 28. The cap screw being unloosened, the sliding element carrying the gauging member is adjusted through the cross member 34 until the inner end of the gauging element is brought into contact with the felloe of the wheel. This being done, the operator tightens the cap screw, and securely locks the sliding element against movement.

The gauge is then removed and assembled in a similar manner in front of the vehicle axle. In order to eliminate any errors arising from distortions of the felloe itself, it is preferable to roll the vehicle either forward or backward so that in the new position the gauge may be arranged to contact with the same portion of the wheel as was previously tested.

Having so adjusted the gauge and vehicle, the operator now places the gauging element in the foremost sliding member 24 and adjusts the latter until the gauging element firmly contacts with the felloe, whereupon its cap screw is tightened so as to lock the element in adjusted position and preventing further movement thereof.

After performing these operations, and adjusting the end sliding members in the manner referred to, a determination of the trueness of the wheels or the amount of disalignment is a comparatively simple matter. The position of the central sliding element 26 has necessarily been affected by the adjustments of the members 24 and 28 owing to the common connection with the cross member 34 to which all are pivoted, and after the adjustment of the members 24 and 28, the member 26 will occupy a position which is the mean difference between the positions of the two end members. The gauging element is now placed in position on the central element 26 which, in reality, now becomes the determining factor in the gauge. The gauge is bodily shifted to bring the element 26 and the gauging element now carried thereby opposite to the point against which the end members were pressed in their adjustment. If the gauging element contacts firmly with the felloe at the front, the wheels will be in perfect alignment. If on the other hand, the end of the gauging element is spaced from the felloe, either by extending beyond or falling short thereof, it will indicate that the wheels are not in proper alignment. The gauging element will then serve as a stop for determining the amount of adjustment required for bringing the wheels back into alignment and with the proper toe-in, and facilitate this operation.

From the construction described and illustrated, it will be observed that the operation of the gauge is automatic in determining the result and no mental calculation whatsoever is necessary in order to determine either that the wheels need adjustment or how much adjustment should be made. The adjustment of the end sliding members 24 and 28 is purely a mechanical one and no error can possibly occur if the operator is careful to obtain in each measurement a firm contact between the gauge element and the face of the felloe. The gauge may readily be used with highly effective results by an unskilled person who is entirely unfamiliar with the actual mechanics of wheel alignment. Thus, the gauge will prove useful to the individual owners of automobiles by determining whether or not the wheels are in alignment. This will serve to warn of existing conditions and enable the car owner to seek the services of a repair man for making the proper adjustments, assuming the owner is not capable of performing such adjustments himself. This ready detection of the condition of the wheels before any substantial harm has been done will save the owner considerable expense by preventing the undue wear upon the tires and bearings. Furthermore, it is obvious that the repair man himself will be saved considerable time and expense by the use of the present gauge owing to the readiness with which the condition of the wheels may be determined and the reliable gauge which is afforded for making the necessary adjustment.

Having thus described the invention, what I claim as new and desire to secure by Letters Patent of the United States is:

1. A device of the class described comprising vertical standards adapted to be positioned adjacent the outer sides of opposite vehicle wheels mounted on the same axle, one of said standards being provided with a stop for engaging the felloe of the adjacent wheel, the other standard being provided with a plurality of members slidably mounted towards and away from the opposite wheel, the said members and stop being located in a horizontal plane passing through the axle of the wheels, a rigid bar pivotally connected to the outer ends of said members, means for retaining certain of said members in adjusted position with respect to the wheel, and a gauging member adapted to be selectively positioned upon the inner end of each of said members and brought into contact with the felloe of the wheel.

2. A device of the character described comprising a supporting base member, vertical standards arising from each end of said base member, one of said standards being provided with a stop for engaging the felloe of a vehicles wheel, the other standard being provided with a transverse head, a plurality of members slidably mounted in said head towards and from the opposite wheel, a common connecting bar pivotally attached to the outer ends of said members, means retaining certain of said members in adjusted position in said head, and a gauging member adapted to be selectively positioned upon the inner ends of each of said members and brought into contact with the felloe of the wheel.

3. A device of the character described comprising a base member, vertical standards mounted upon each end of the base, a stop member upon the upper end of one of said standards adapted to be brought into contact with the felloe of a vehicle wheel, a head upon the upper end of the opposite standard, the said head being provided with spaced transverse openings, a slidable member mounted in each of said openings for movement towards and from the felloe of the opposite wheel, a rigid connecting bar having elongated slots and being pivotally attached to the outer ends of said sliding members, the pivots of certain of said members operating in said elongated slots, means for locking certain of said sliding members in adjusted position in said head, and a gauge member adapted to be selectively mounted on the inner end of each of said slidable members to determine the trueness of the tires.

4. A device of the character described comprising a base member, vertical standards mounted upon each end of the base, one of said standards having pivotally mounted on its upper end a stop member adapted to contact with the outer face of the felloe of a vehicle wheel, the other standard having a transverse head upon its upper end, there being three openings extending through said head, the openings being arranged in a common horizontal plane, a slidable member mounted in each of said openings, and adapted to assume various positions of adjustment with respect to the opposite wheel, a connecting bar pivotally attached to the outer ends of the slidable members and provided with elongated slots, the pivot of the outer members, operating in said elongated slots, and the central sliding member being slightly longer than the outer members, means for locking the outer members in adjusted position, and a gauging member adapted to be selectively attached to the inner end of each of said members in order to determine the angle of diversion between the wheels.

5. A device for testing the alignment of vehicle wheels which comprises a transverse base member slightly greater in length than the width of the vehicle, means for reinforcing said base member, a vertical standard mounted upon each of the outer ends of said base member, one of said standards being provided with a stop extending inwardly into contact with the felloe of the adjacent wheel, the opposite of said standards being provided at its upper end with a transverse head, there being three spaced openings in said head extending parallel to the axle of the wheel, said openings being arranged in a horizontal plane passing through the axle, a sliding member mounted in each of said openings, a common cross bar pivotally connected to the outer ends of said sliding members, means for locking the outer members in adjusted position in said head, and a gauging element adapted to telescopically fit within the inner end of said sliding members, the said gauge member forming an effective continuation of the sliding member to which it is attached and approximating in length the side bulge of the tire beyond the felloe so that the inner end of the gauge element will terminate in proximity to the felloe of the wheel.

In testimony whereof, I have hereunto set my signature.

CAPELLE HATCHER ARCHER.